(12) United States Patent
Miyagi et al.

(10) Patent No.: US 8,463,037 B2
(45) Date of Patent: Jun. 11, 2013

(54) DETECTION OF LOW CONTRAST FOR IMAGE PROCESSING

(75) Inventors: Kensuke Miyagi, Sunnyvale, CA (US);
Florian Ciurea, San Jose, CA (US);
Pingshan Li, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 168 days.

(21) Appl. No.: 13/077,404

(22) Filed: Mar. 31, 2011

(65) Prior Publication Data

US 2012/0250999 A1    Oct. 4, 2012

(51) Int. Cl.
*G06K 9/00*    (2006.01)

(52) U.S. Cl.
USPC ............................................. 382/172

(58) Field of Classification Search
USPC ............... 382/162–172, 191, 236, 251, 253, 382/270, 274; 348/402.1, 404.1, 407.1, 409.1, 348/413.1, 416.1, 431.1; 375/240.02, 240.12, 375/240.13, 240.16, 240.22
See application file for complete search history.

(56) References Cited

U.S. PATENT DOCUMENTS

| | | | | |
|---|---|---|---|---|
| 4,904,855 A | * | 2/1990 | Nishibe et al. | 250/201.8 |
| 5,038,389 A | * | 8/1991 | Mizuno | 382/248 |
| 5,144,426 A | * | 9/1992 | Tanaka et al. | 375/240.13 |
| 5,528,514 A | * | 6/1996 | Hancock et al. | 709/247 |
| 5,684,815 A | * | 11/1997 | Miura et al. | 372/40 |
| 5,748,231 A | * | 5/1998 | Park et al. | 348/207.99 |
| 5,969,772 A | * | 10/1999 | Saeki | 348/699 |
| 6,055,025 A | * | 4/2000 | Shahraray | 348/700 |
| 6,078,686 A | * | 6/2000 | Kim | 382/167 |
| 6,628,831 B1 | * | 9/2003 | Needham | 382/168 |
| 6,670,963 B2 | * | 12/2003 | Osberger | 345/629 |
| 6,810,144 B2 | * | 10/2004 | McGee et al. | 382/166 |
| 7,072,398 B2 | | 7/2006 | Ma | |
| 7,302,015 B2 | | 11/2007 | Kim et al. | |
| 7,424,148 B2 | * | 9/2008 | Goh | 382/169 |
| 7,483,486 B2 | * | 1/2009 | Mantiuk et al. | 375/240.03 |

OTHER PUBLICATIONS

"Fractal indexing with the joint statistical properties and its application in texture image retrieval," IET Image processing, 2008, vol. 2, No. 4, pp. 218-230.

* cited by examiner

*Primary Examiner* — Jose Couso
(74) *Attorney, Agent, or Firm* — Haverstock & Owens LLP

(57) ABSTRACT

There are many applications that conduct both generation of contrast or complexity level and motion estimation for video processing. The applications often use a block matching technique. An embedded system such as a personal digital camera is an example of such an application. Additionally, comparison of error differences around the location of minimum error in a motion estimation error table is able to be used to determine low contrast in a scene.

13 Claims, 9 Drawing Sheets

Method 1: Calculate accuracy of motion vector between Matching Area 1 and Matching Area 2

Method 2: Calculate accuracy of motion vector between Matching Area 1 and Matching Area 1

Method 3: Calculate difference in matching before and after convolution with Gaussian filter

DETECTION OF LOW CONTRAST FOR IMAGE PROCESSING

FIELD OF THE INVENTION

The present invention relates to the field of image and video processing. More specifically, the present invention relates to applications which utilize or rely on contrast level information such as picture matching and video compression.

BACKGROUND OF THE INVENTION

Motion estimation is a widely used technique in image processing to find or estimate motion in a set of images. For example, for two 2-dimensional images, in order to estimate motion between these two images, a Sum of Absolute Differences (SAD) or another equivalent calculation is able to be applied on an m×n matching area with a search range of +/−k and +/−l in horizontal and vertical directions respectively, and then the position which yields the smallest SAD is able to be found. FIG. 4 illustrates an example of 2-dimensional motion estimation. In some implementations, a mathematical function is applied to an image to assist in determining a contrast level of the image.

SUMMARY OF THE INVENTION

There are many applications that require generation of contrast or complexity level. The applications often use a block matching technique. An embedded system such as a personal digital camera is an example of such an application. Additionally, comparison of error differences such as a gradient around the minimum error is able to be used to determine low contrast in a scene.

In one aspect, a method of determining low contrast in a scene, programmed in a memory in a device comprises determining a difference between a minimum error value and a set of error values and determining if the difference is less than a threshold, wherein if the difference is less than the threshold, then low contrast is indicated and if the difference is not less than the threshold, then not low contrast is indicated. The set of error values is in a search area. The error values are each a sum of absolute differences. The difference is determined using a derivative or gradient around the location of minimum error. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a Blu-ray® writer/player, a television and a home entertainment system.

In another aspect, a system programmed in a memory in a device comprises a motion estimation module for performing motion estimation including generating a motion vector and a set of error values, a difference determination module for determining a difference between a minimum error of the set of error values and a remaining set of error values of the set of error values, a threshold module for comparing the difference to a threshold and an indicator module for indicating low contrast in a scene based on comparing the difference and the threshold. The set of error values is in a search area. The error values are each a sum of absolute differences. The difference is determined using a derivative or gradient around the location of minimum error. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a Blu-ray® writer/player, a television and a home entertainment system.

In another aspect, a device comprises a memory for storing an application, the application for determining a difference between a minimum error value and a set of error values and determining if the difference is less than a threshold, wherein if the difference is less than the threshold, then low contrast is indicated and if the difference is not less than the threshold, then not low contrast is indicated and a processing component coupled to the memory, the processing component configured for processing the application. The set of error values is in a search area. The error values are each a sum of absolute differences. The difference is determined using a derivative or gradient around the location of minimum error. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a Blu-ray® writer/player, a television and a home entertainment system.

In yet another aspect, a video capture device comprises a memory for storing an application, the application for determining a difference between a minimum error value and a set of error values and determining if the difference is less than a threshold, wherein if the difference is less than the threshold, then low contrast is indicated and if the difference is not less than the threshold, then not low contrast is indicated, a processing component coupled to the memory, the processing component configured for processing the application and a storage component for storing the video. The set of error values is in a search area. The error values are each a sum of absolute differences. The difference is determined using a derivative or gradient around the location of minimum error. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a Blu-ray® writer/player, a television and a home entertainment system.

In another aspect, a method of determining low contrast in a scene, programmed in a memory in a device, comprises performing motion estimation between a first area and a second area, generating a contrast level computed around a location of a minimum error, determining if the contrast level is less than a threshold, wherein if the contrast level is less than the threshold, then low contrast is indicated and if the contrast level is not less than the threshold, then not low contrast is indicated. The method further comprises generating an error table. The location of the minimum error is from the error table. The first area and the second area are a different location. The first area and the second area are the same location.

In another aspect, a method of determining low contrast in a scene, programmed in a memory in a device comprises performing a convolution of an area with a Gaussian kernel to generate a convolved area, determining a difference between the area and the convolved area and determining if the difference is less than a threshold, wherein if the difference is less than the threshold, then low contrast is indicated and if the difference is not less than the threshold, then not low contrast is indicated. The method further comprises generating an error table. The difference is determined from the error table.

DETAILED DESCRIPTION OF THE PREFERRED EMBODIMENT

There are many applications that conduct motion estimation for video processing. The applications often use a block matching technique. An embedded system such as a personal digital camera/camcorder is an example of such an application.

There are several ways to compute the contrast level of an image, such as applying a high-pass filter, computing the standard deviation and other ways. These contrast levels are often used to determine how to process the image. For example, in video compression, the complexity level is able to be used to determine the amount of bit allocation.

Figure 1:
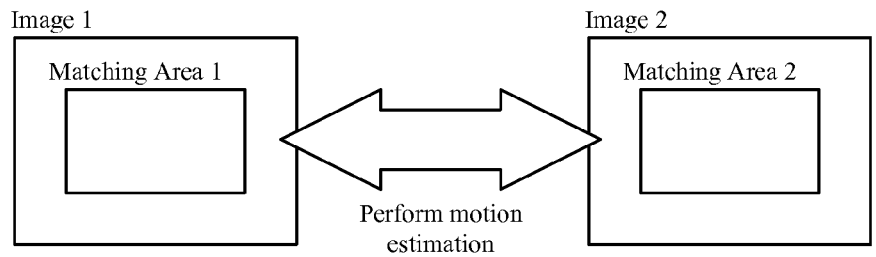
FIG. 1 illustrates an overview of three methods to indicate low contrast.
Figure 1:
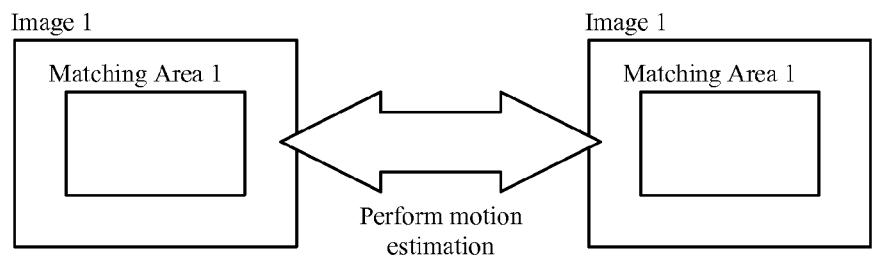
Figure 1:
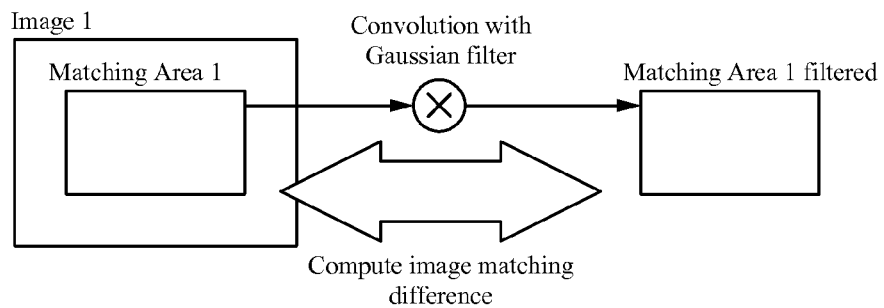

FIG. 1 illustrates an overview of three methods to indicate low contrast. In implementation 100, the accuracy of the motion vector between a first matching area (also referred to as Matching Area 1) and a second matching area (also referred to as Matching Area 2) is calculated. In implementation 102, the accuracy of the motion vector between Matching Area 1 and Matching Area 1 is calculated. In implementation 104, the image matching difference is calculated for Matching Area 1 and a convolved, filtered Matching Area 1.

Figure 2:
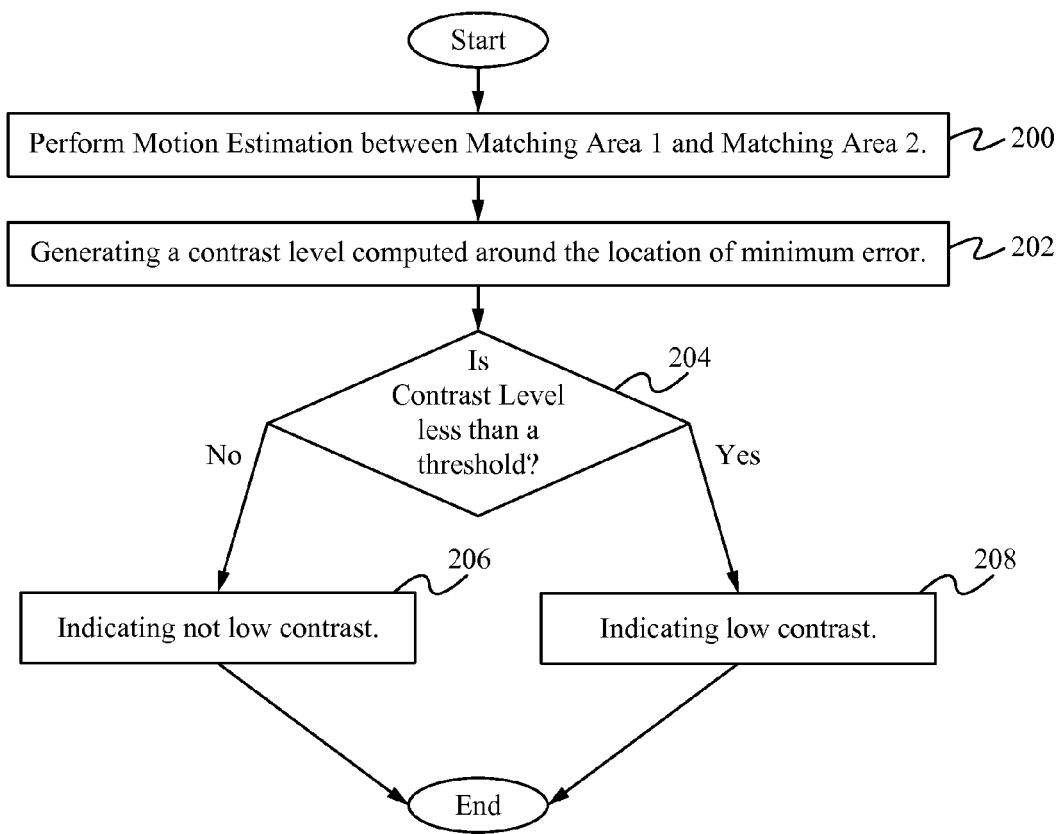
FIG. 2 illustrates an overview of method to indicate low contrast based on computing accuracy of motion vector between two different Matching Areas.

FIG. 2 illustrates an overview of method to indicate low contrast based on computing accuracy of motion vector between two different Matching Areas. In the step 200, motion estimation is performed between Matching Area 1 and Matching Area 2. In some embodiments, an error table is generated during the step 200. In the step 202, a contrast level is generated. In some embodiments, the contrast level is computed around the location of minimum error. In the step 204, the contrast level is compared to a threshold, where if the contrast level is not less than the threshold, then not low contrast is indicated, in the step 206, and if the difference is less than the threshold, then low contrast is indicated, in the step 208. Indicating is able to be any implementation such as sending a '0' to indicate not low contrast and a '1' to indicate low contrast. Fewer or additional steps are able to be included as well.

Figure 3A:
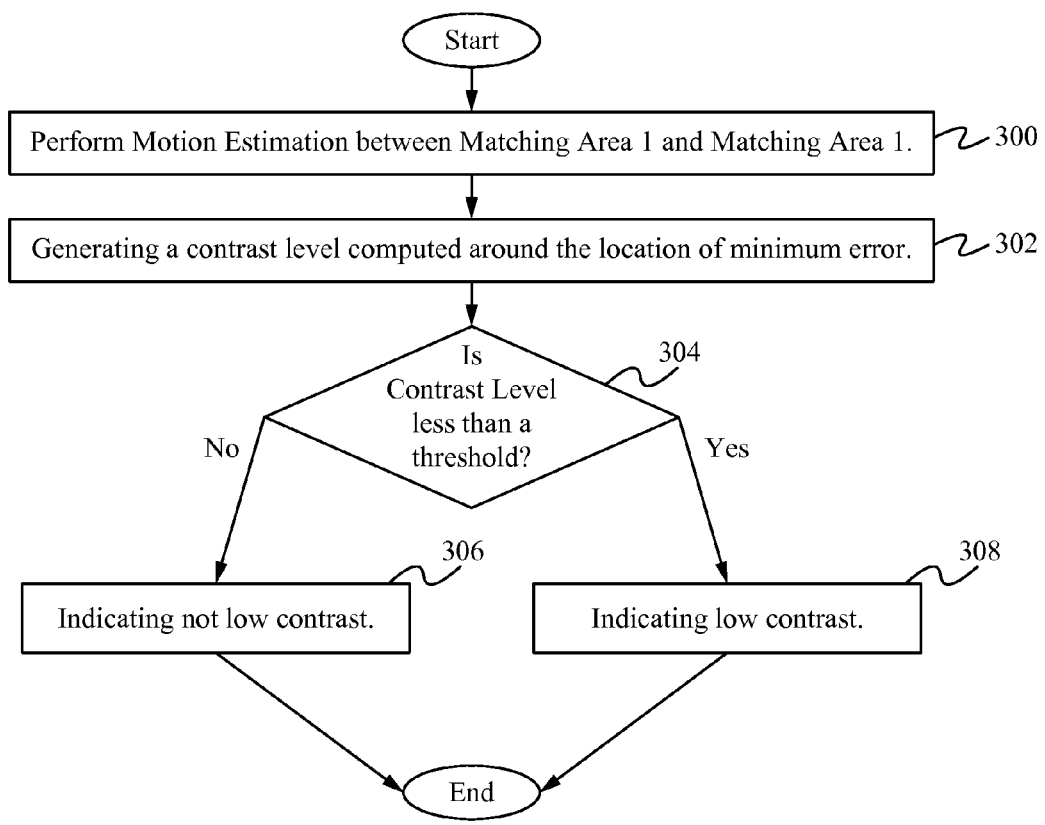
FIG. 3A illustrates an overview of method to indicate low contrast based on computing accuracy of motion vector using same Matching Area as input.

FIG. 3A illustrates an overview of method to indicate low contrast based on computing accuracy of motion vector using same Matching Area as input. In the step 300, motion estimation is performed between Matching Area 1 and Matching Area 1 (hence the same area of a scene but at a different time). This computes a local contrast of Matching Area 1. In some embodiments, an error table is generated during the step 300. In the step 302, a contrast level is generated. In some embodiments, the contrast level is computed around the location of minimum error. In the step 304, the contrast level is compared to a threshold, where if the contrast level is not less than the threshold, then not low contrast is indicated, in the step 306, and if the difference is less than the threshold, then low contrast is indicated, in the step 308. Indicating is able to be any implementation such as sending a '0' to indicate not low contrast and a '1' to indicate low contrast. Fewer or additional steps are able to be included as well.

Figure 3B:
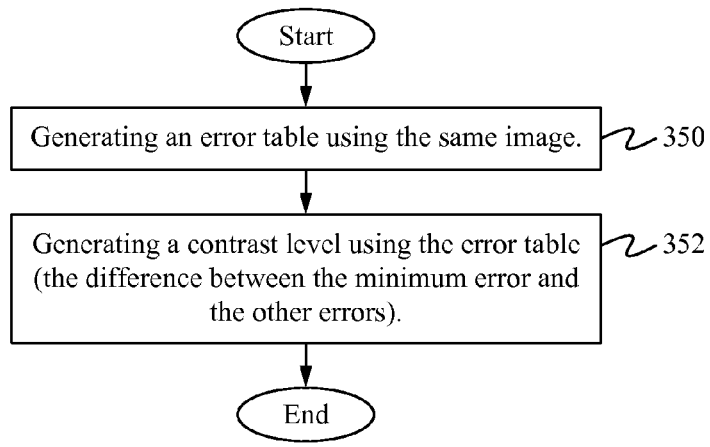
FIG. 3B illustrates a flowchart of a method of generating a contrast level.
Figure 4:
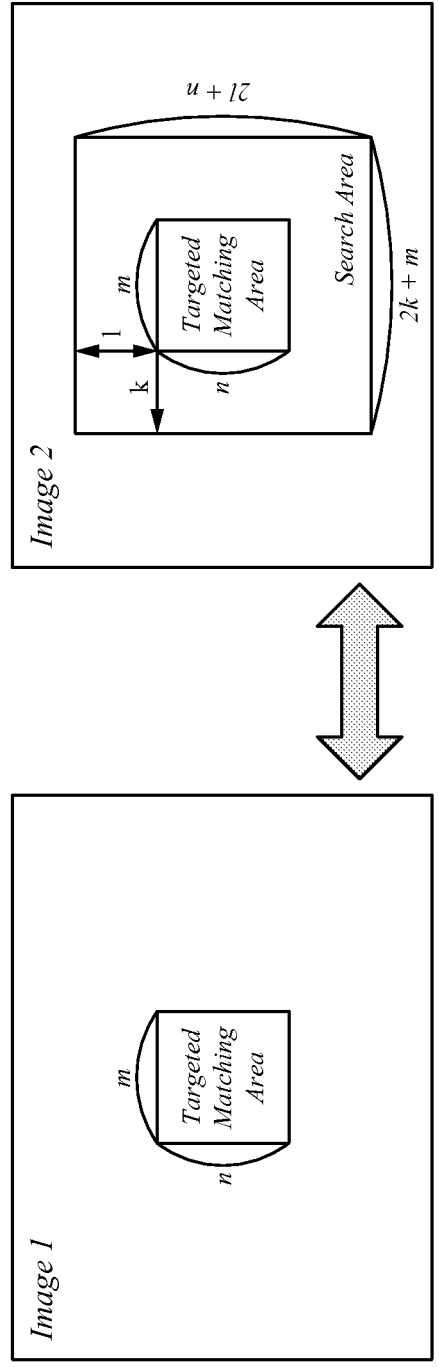
FIG. 4 illustrates a diagram of general 2-dimensional motion estimation.

FIG. 3B illustrates a flowchart of a method of generating a contrast level. In the step 350, an error table is generated using a same image. In the step 352, a contrast level is using the error table, where the error table is the difference between the minimum error and other errors. Additional steps are able to be included as well.

In embedded systems, although it is desirable to reduce the hardware or CPU computational cost, several applications such as video compression in a digital camcorder perform both contrast/complexity calculation and motion estimation using a different computational method, for instance, a standard deviation type of calculation for complexity generation and a sum-of-absolute-differences (SAD) type of computation.

Figure 5:
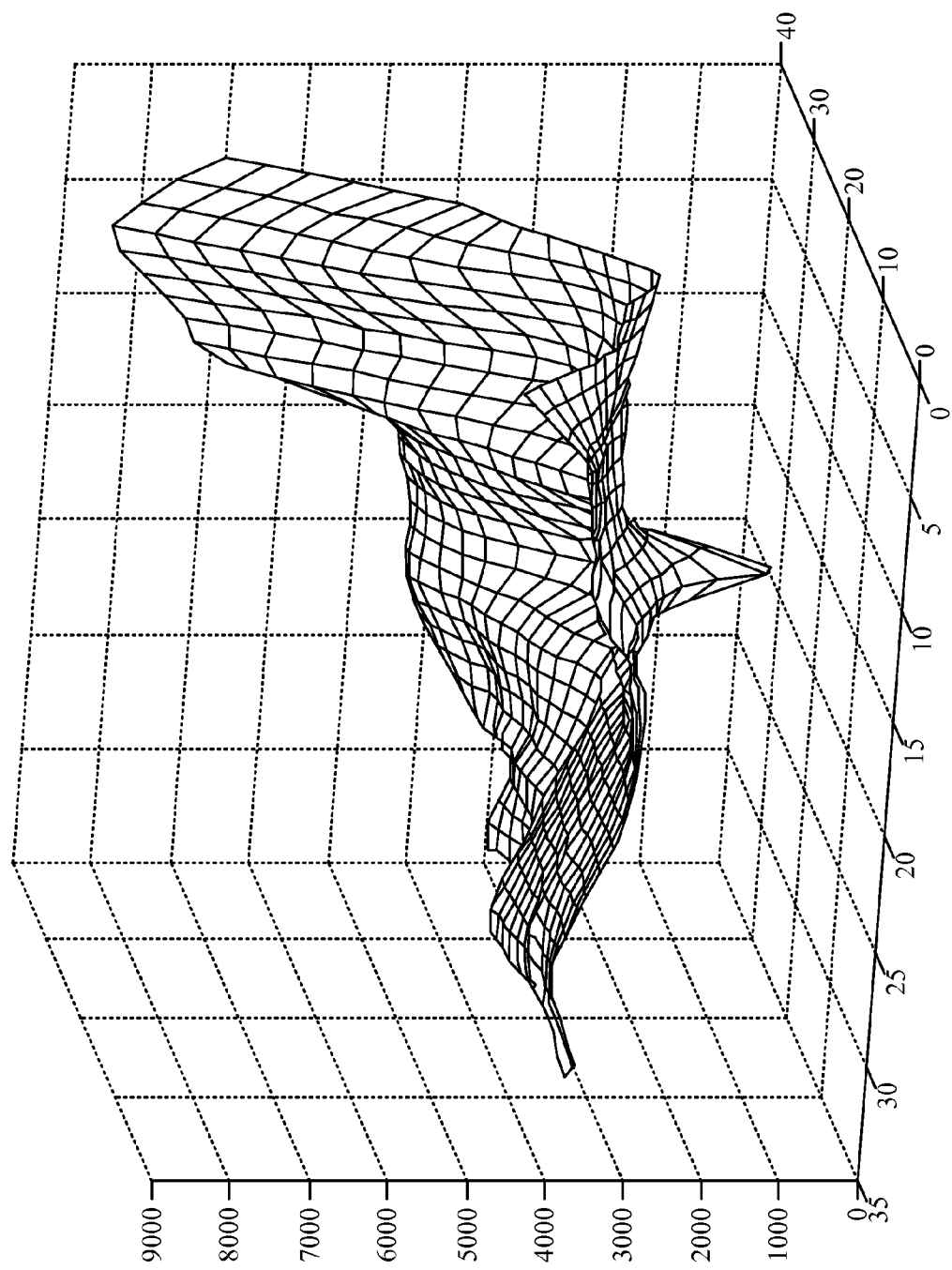
FIG. 5 illustrates an exemplary SAD surface generated as a result of 2-dimensional motion estimation which corresponds to high contrast case.

Block matching is a technique often used in motion estimation, and block matching usually generates an error table which is able to be plotted as a curved surface as shown in FIG. 5.

Figure 6:
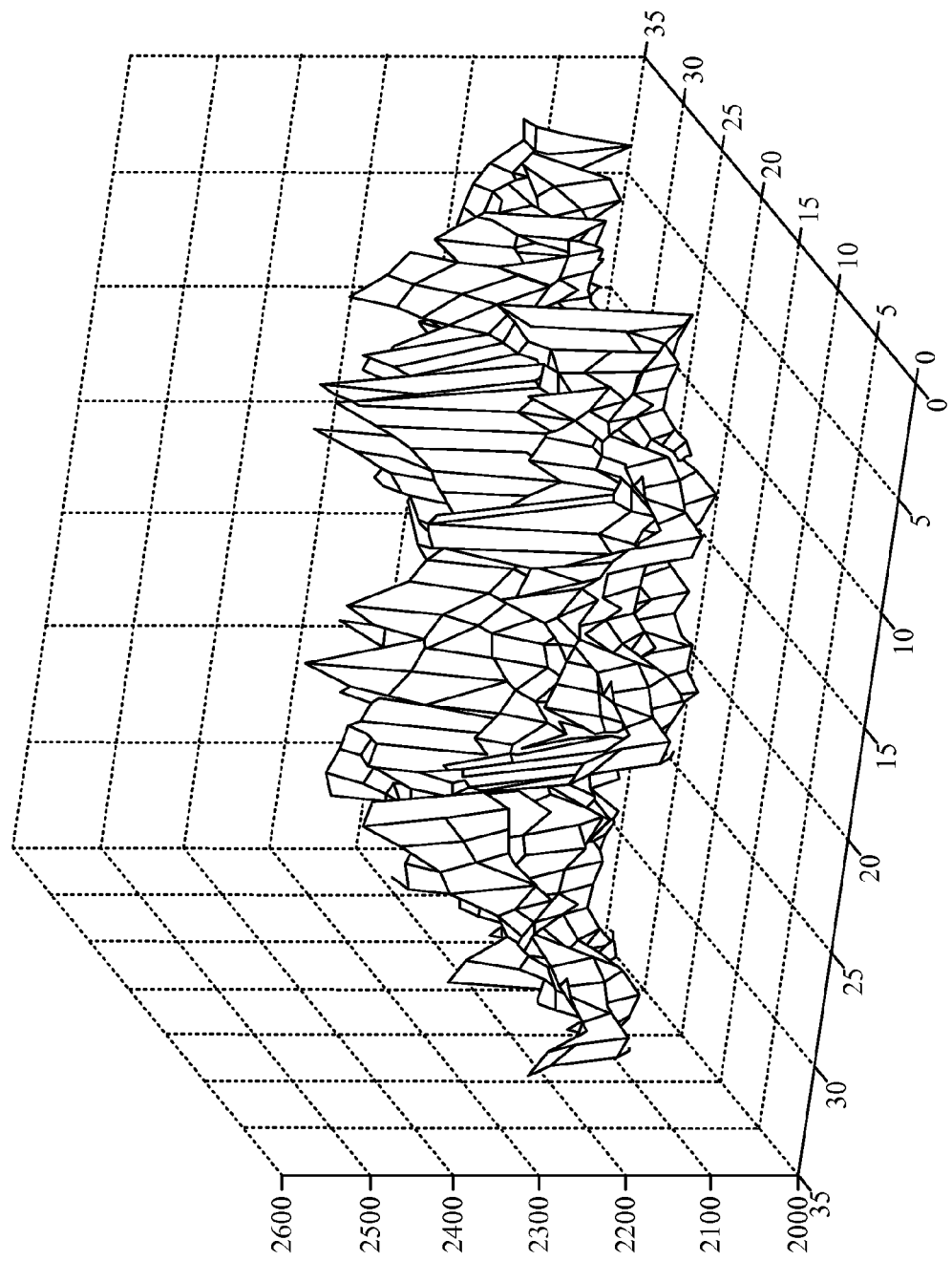
FIG. 6 illustrates an exemplary SAD surface generated as a result of 2-dimensional motion estimation which corresponds to low contrast case.

In the example in FIG. 5, a location of minimum error is easily identified, since the gradient around the location of minimum error is relatively high. In cases similar to this example, it is fair to assume the motion estimation result is relatively reliable. FIG. 6 illustrates an example of a curved surface where it is not easy to identify the location of minimum error and thus, fair to assume the motion estimation result is not necessarily reliable. In FIGS. 5 and 6, the vertical axis is the error value and the bottom plane corresponds to the search area.

Using the "steepness" which is able to be measured using the derivative or gradient around the location of minimum error of a block matching error table to generate the contrast level is described herein. When the contrast of the matching block is higher, there will be a more obvious or higher gradient around location of minimum error at a position with a minimum error in the curved surface of error table generated in block matching. Thus, the steepness around the location of minimum error is able to be used to indicate the contrast level.

Figure 7:
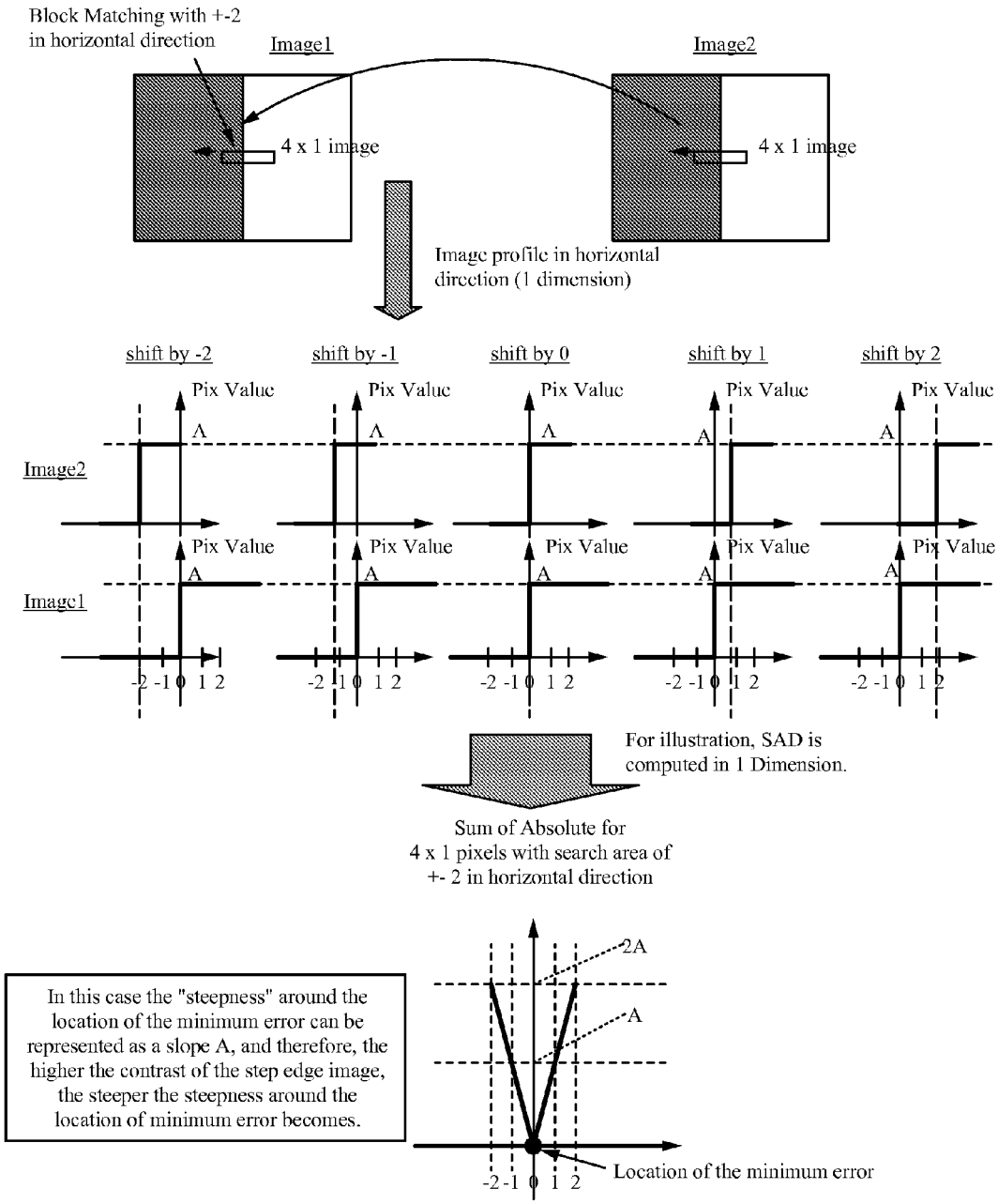
FIG. 7 illustrates an exemplary SAD curve generated as a result of 1-dimensional motion estimation which corresponds to a step-edge image (high contrast case).

In order to illustrate the validity of the assumptions, an example of a block matching conducted on two identical step edges is shown in FIG. 7. In this example, a 4×1 pixel area at the center of the image is used for a block matching target, and +/−2 in horizontal directions are used for the search area. FIG. 7 shows the "steepness" around the location of minimum error is proportional to the pixel value A, by which the contrast level, of the image determines the "steepness." In this example, a step edge is used.

Implementing the measurement of the "steepness" in a three dimensional curved surface of an error table is described herein. Shown below is a table of 5×5 SAD values generated by block matching.

$$ErrorTable = \begin{bmatrix} e & e & e & e & e \\ e & s_1 & s_2 & s_3 & e & e \\ e & s_4 & m & s_5 & e & e \\ e & s_6 & s_7 & s_8 & e & e \\ e & e & e & e & e \\ e & e & e & e & e \end{bmatrix}$$

In the ErrorTable shown above, m is the minimum SAD, and its surrounding SADs are shown as $s_1, s_2, \ldots s_8$, and other SADs are shown as e. There are 8 surrounding SADs, each of which is able to have a different value from one another but larger than m. One example of the contrast level model is able to be formulated as following:

$$ContrastLevel = \frac{\sum_{i=1}^{8}(s_i - m)}{8}$$

Also, if a threshold value is set to determine the contrast, the threshold is able to be implemented such as:

Threshold=k×m, where k is able to be any fractional number.

The technique is able to be used with very little additional cost whenever there is an existence of a motion estimation module. For instance, in video compression, usually a contrast or complexity measurement, which is often called an activity is calculated. One of the common methods to calculate this activity in MPEG2 Video CODEC is to calculate the standard deviation of the rectangular block. However, using the technique to calculate the activity and adjusting the rate control which uses the activity values, it is possible to remove the standard deviation calculation module in the video compression module and reduce the cost for the motion estimation module.

After motion estimation is performed, an error (e.g. SAD) exists for two matching blocks or images including errors for each position in a search area, for example, a set of error values (3×3 or 5×5). A motion vector is also determined during motion estimation. Finding the difference between the minimum SAD and the rest of the SADs is able to be used to determine if the motion vector is accurate. The difference is able to be found using a derivative or gradient around the minimum point or any other means. A threshold is able to be implemented where if the difference between the minimum SAD and the rest of the SADs is below the threshold, then the motion vector is not accurate, and if the difference is above the threshold, the motion vector is accurate. The threshold is also able to be implemented in an opposite fashion where above the threshold indicates not accurate and below is accurate. In order to do this, the contrast level formula is changed.

Figure 8:
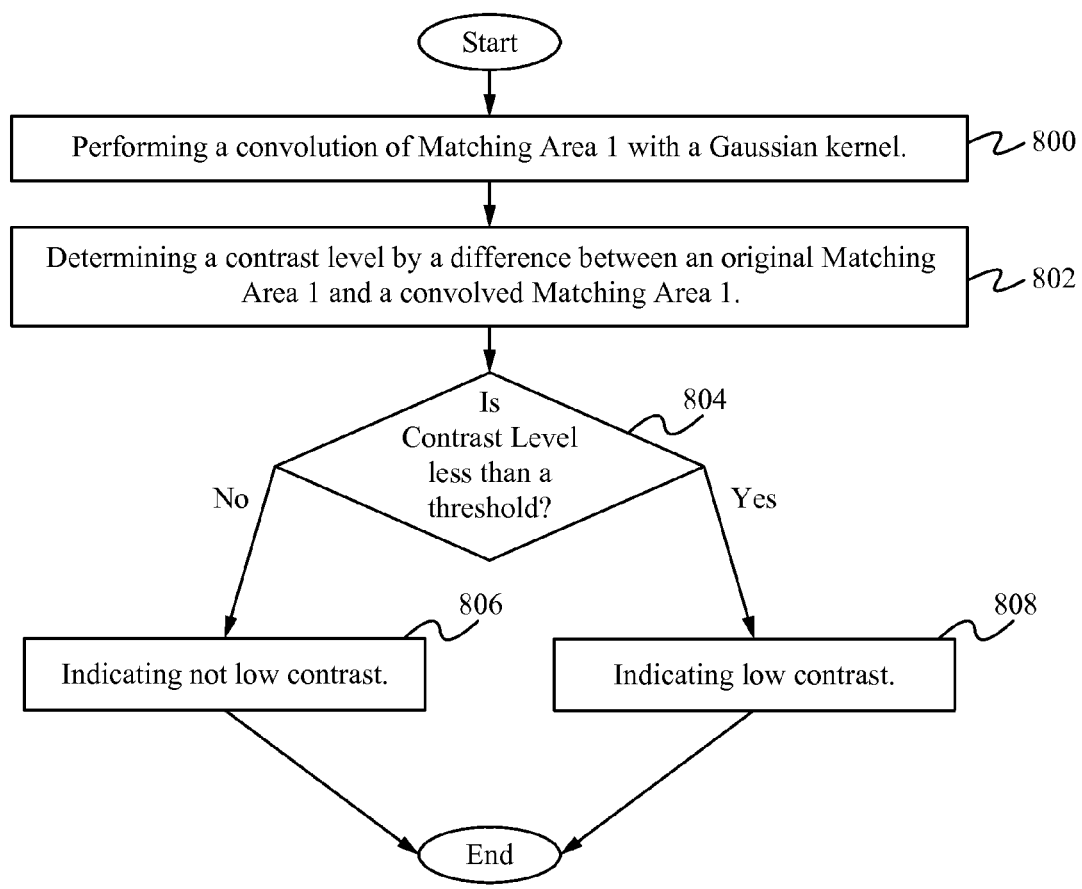
FIG. 8 illustrates an overview of method to indicate low contrast based on computing difference between original Matching Area and a low-pass version of the original Matching Area.

FIG. 8 illustrates an overview of method to indicate low contrast based on computing difference between original Matching Area and a low-pass version of the original Matching Area. In the step 800, a convolution of Matching Area 1 is convolved with a Gaussian kernel. In some embodiments, convolution involves a low-pass filter. In the step 802, a contrast level is determined by a difference between an original Matching Area 1 and a convolved Matching Area 1. Generation of the SAD table with the same image is able to be used to generate a contrast level. In some embodiments, the difference is a steepness or slope between the minimum error and the neighboring errors which is measured using a derivative or gradient. The higher the steepness, the higher the contrast level of the block. In the step 804, the contrast level is compared to a threshold, where if the contrast level is not less than the threshold, then not low contrast is indicated, in the step 806, and if the contrast level is less than the threshold, then the low contrast is indicated, in the step 808. Indicating is able to be any implementation such as sending a '0' to indicate not low contrast and a '1' to indicate low contrast. Fewer or additional steps are able to be included as well.

Figure 9:
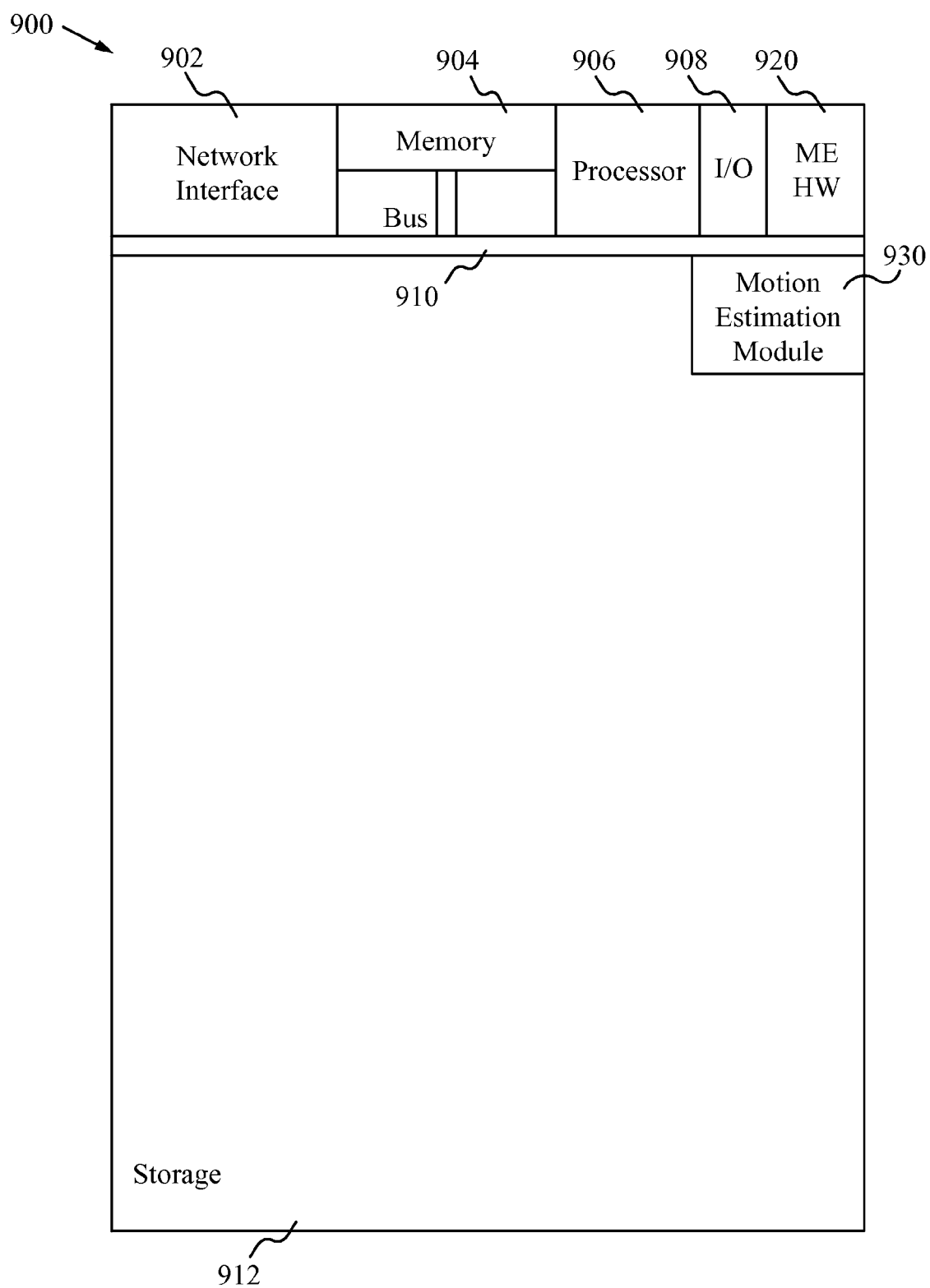
FIG. 9 illustrates a block diagram of an exemplary computing device configured to implement motion estimation according to some embodiments.

FIG. 9 illustrates a block diagram of an exemplary computing device 900 configured to implement motion estimation according to some embodiments. The computing device 900 is able to be used to acquire, store, compute, communicate and/or display information such as images and videos. For example, a computing device 900 is able to acquire and store a video. In general, a hardware structure suitable for implementing the computing device 900 includes a network interface 902, a memory 904, a processor 906, I/O device(s) 908, a bus 910 and a storage device 912. The choice of processor is not critical as long as a suitable processor with sufficient speed is chosen. The memory 904 is able to be any conventional computer memory known in the art. The storage device 912 is able to include a hard drive, CDROM, CDRW, DVD, DVDRW, flash memory card or any other storage device. The computing device 900 is able to include one or more network interfaces 902. An example of a network interface includes a network card connected to an Ethernet or other type of LAN. The I/O device(s) 908 are able to include one or more of the following: keyboard, mouse, monitor, display, printer, modem, touchscreen, button interface and other devices. Motion estimation application(s) or module(s) 930 used to perform the motion estimation method are likely to be stored in the storage device 912 and memory 904 and processed as applications are typically processed. More or less components shown in FIG. 9 are able to be included in the computing device 900. In some embodiments, motion estimation hardware 920 is included. Although the computing device 900 in FIG. 9 includes applications 930 and hardware 920 for motion estimation applications, the motion estimation method is able to be implemented on a computing device in hardware, firmware, software or any combination thereof.

In some embodiments, the motion estimation application(s) 930 include several applications and/or modules. In some embodiments, the motion estimation application(s) 930 include a motion estimation module, a difference determination module, a threshold module and an indicator module. The modules implement the method described herein. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a Blu-ray® writer/player, a television, a home entertainment system or any other suitable computing device.

To utilize the fast iterative motion estimation method, a user captures a video such as on a digital camcorder or a video player, and while the video is being captured, the motion estimation performs motion estimation on the video to capture the video correctly and efficiently. The motion estimation occurs automatically without user involvement.

In operation, comparison of error differences around the location of minimum error in a motion estimation error table is able to be used to determine low contrast in a scene.

Detection of low contrast is useful for several imaging applications. Using available results from the motion estimation module, two methods are presented which can detect low contrast in a scene based on analyzing the change in sum of absolute differences around the location with minimum sum of absolute difference, as computed by the motion estimation module. A third method relies on convolving an image with a gaussian kernel and analyzing the difference between the original and the convolved image.

Some Embodiments of Detection of Low Contrast for Image Processing

1. A method of determining low contrast in a scene, programmed in a memory in a device, the method comprising:
    a. determining a difference between a minimum error value and a set of error values; and
    b. determining if the difference is less than a threshold, wherein if the difference is less than the threshold, then low contrast is indicated and if the difference is not less than the threshold, then not low contrast is indicated.
2. The method of clause 1 wherein the set of error values is in a search area.
3. The method of clause 1 wherein the error values are each a sum of absolute differences.
4. The method of clause 1 wherein the difference is determined using a derivative or gradient around the location of minimum error.
5. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a Blu-ray® writer/player, a television and a home entertainment system.
6. A system programmed in a memory in a device comprising:
    a. a motion estimation module for performing motion estimation including generating a motion vector and a set of error values;
    b. a difference determination module for determining a difference between a minimum error of the set of error values and a remaining set of error values of the set of error values;
    c. a threshold module for comparing the difference to a threshold; and
    d. an indicator module for indicating low contrast in a scene based on comparing the difference and the threshold.
7. The system of clause 6 wherein the set of error values is in a search area.
8. The system of clause 6 wherein the error values are each a sum of absolute differences.
9. The system of clause 6 wherein the difference is determined using a derivative or gradient around the location of minimum error.
10. The system of clause 6 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a Blu-ray® writer/player, a television and a home entertainment system.
11. A device comprising:
    a. a memory for storing an application, the application for:
        i. determining a difference between a minimum error value and a set of error values; and
        ii. determining if the difference is less than a threshold, wherein if the difference is less than the threshold, then low contrast is indicated and if the difference is not less than the threshold, then not low contrast is indicated; and
    b. a processing component coupled to the memory, the processing component configured for processing the application.
12. The device of clause 11 wherein the set of error values is in a search area.
13. The device of clause 11 wherein the error values are each a sum of absolute differences.
14. The device of clause 11 wherein the difference is determined using a derivative or gradient around the location of minimum error.
15. The device of clause 11 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a Blu-ray® writer/player, a television and a home entertainment system.
16. A video capture device comprising:
    a. a memory for storing an application, the application for:
        i. determining a difference between a minimum error value and a set of error values; and
        ii. determining if the difference is less than a threshold, wherein if the difference is less than the threshold, then low contrast is indicated and if the difference is not less than the threshold, then not low contrast is indicated; and
    b. a processing component coupled to the memory, the processing component configured for processing the application; and
    c. a storage component for storing the video.
17. The system of clause 16 wherein the set of error values is in a search area.
18. The system of clause 16 wherein the error values are each a sum of absolute differences.
19. The system of clause 16 wherein the difference is determined using a derivative or gradient around the location of minimum error.
20. The system of clause 16 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a Blu-ray® writer/player, a television and a home entertainment system.
21. A method of determining low contrast in a scene, programmed in a memory in a device, the method comprising:
    a. performing motion estimation between a first area and a second area;
    b. generating a contrast level computed around a location of a minimum error;

c. determining if the contrast level is less than a threshold, wherein if the contrast level is less than the threshold, then low contrast is indicated and if the contrast level is not less than the threshold, then not low contrast is indicated.

22. The method of clause 21 further comprising generating an error table.

23. The method of clause 22 wherein the location of the minimum error is from the error table.

24. The method of clause 21 wherein the first area and the second area are a different location.

25. The method of clause 21 wherein the first area and the second area are the same location.

26. A method of determining low contrast in a scene, programmed in a memory in a device, the method comprising:
   a. performing a convolution of an area with a Gaussian kernel to generate a convolved area;
   b. determining a difference between the area and the convolved area; and
   c. determining if the difference is less than a threshold, wherein if the difference is less than the threshold, then low contrast is indicated and if the difference is not less than the threshold, then not low contrast is indicated.

27. The method of clause 26 further comprising generating an error table.

28. The method of clause 27 wherein the difference is determined from the error table.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system programmed in a memory in a device comprising:
   a. a motion estimation module for performing motion estimation including generating a motion vector and a set of error values;
   b. a difference determination module for determining a difference between a minimum error of the set of error values and a remaining set of error values of the set of error values;
   c. a threshold module for comparing the difference to a threshold; and
   d. an indicator module for indicating low contrast in a scene based on comparing the difference and the threshold.

2. The system of claim 1 wherein the set of error values is in a search area.

3. The system of claim 1 wherein the error values are each a sum of absolute differences.

4. The system of claim 1 wherein the difference is determined using a derivative or gradient around the location of minimum error.

5. The system of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a Blu-ray® writer/player, a television and a home entertainment system.

6. A method of determining low contrast in a scene, programmed in a memory in a device, the method comprising:
   a. performing motion estimation between a first area and a second area;
   b. generating a contrast level computed around a location of a minimum error; and
   c. determining, with the device, if the contrast level is less than a threshold, wherein if the contrast level is less than the threshold, then low contrast is indicated and if the contrast level is not less than the threshold, then not low contrast is indicated.

7. The method of claim 6 further comprising generating an error table.

8. The method of claim 7 wherein the location of the minimum error is from the error table.

9. The method of claim 6 wherein the first area and the second area are a different location.

10. The method of claim 6 wherein the first area and the second area are the same location.

11. A method of determining low contrast in a scene, programmed in a memory in a device, the method comprising:
   a. performing a convolution of an area with a Gaussian kernel to generate a convolved area;
   b. determining, with a device, a difference between the area and the convolved area; and
   c. determining, with a device, if the difference is less than a threshold, wherein if the difference is less than the threshold, then low contrast is indicated and if the difference is not less than the threshold, then not low contrast is indicated.

12. The method of claim 11 further comprising generating an error table.

13. The method of claim 12 wherein the difference is determined from the error table.

* * * * *